US007209932B2

(12) United States Patent
Dewey

(10) Patent No.: US 7,209,932 B2
(45) Date of Patent: Apr. 24, 2007

(54) METHOD, SYSTEM, AND PROGRAM FOR ALLOCATING TASKS TO A PLURALITY OF PROCESSORS

(75) Inventor: Douglas William Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/108,162

(22) Filed: Mar. 25, 2002

(65) Prior Publication Data

US 2003/0182350 A1 Sep. 25, 2003

(51) Int. Cl.
*G06F 12/00* (2006.01)
*G06F 9/52* (2006.01)
*G06F 9/44* (2006.01)

(52) U.S. Cl. ............... 707/203; 718/100; 707/3; 707/8; 707/201; 707/6; 711/141; 711/168

(58) Field of Classification Search ........... 713/200; 714/13, 14; 707/200–206, 1–10, 100–104; 719/310–332; 711/108–173; 718/1, 100–108
See application file for complete search history.

(56) References Cited

U.S. PATENT DOCUMENTS

| | | | |
|---|---|---|---|
| 3,969,758 A | | 7/1976 | Okey |
| 4,073,005 A | * | 2/1978 | Parkin .................. 718/104 |
| 4,747,100 A | | 5/1988 | Roach et al. |
| 4,924,384 A | | 5/1990 | Hao et al. |
| 5,039,980 A | * | 8/1991 | Aggers et al. ............ 340/506 |
| 5,047,918 A | * | 9/1991 | Schwartz et al. ........ 707/203 |
| 5,109,511 A | * | 4/1992 | Nitta et al. .............. 718/104 |
| 5,222,238 A | * | 6/1993 | Zobre et al. ............ 710/240 |
| 5,287,499 A | * | 2/1994 | Nemes ..................... 707/2 |
| 5,406,278 A | * | 4/1995 | Graybill et al. .......... 341/51 |
| 5,410,695 A | * | 4/1995 | Frey et al. .............. 719/313 |
| 5,483,535 A | | 1/1996 | McMillen et al. |
| 5,506,961 A | | 4/1996 | Carlson et al. |
| 5,555,371 A | * | 9/1996 | Duyanovich et al. ...... 714/13 |
| 5,574,902 A | * | 11/1996 | Josten et al. ............ 707/1 |
| 5,577,249 A | * | 11/1996 | Califano ................ 707/100 |

(Continued)

OTHER PUBLICATIONS

IBM, "Card-To-Card Communication", Technical Disclosure Bulletin, vol. 25, No. 10, Mar. 1983, pp. 5236-5239.

(Continued)

*Primary Examiner*—Lewis A. Bullock, Jr.
(74) *Attorney, Agent, or Firm*—Rabindranath Dutta; Konrad Raynes & Victor LLP

(57) ABSTRACT

Provided are a method, system, and program to allocate tasks among a plurality of processes within a distributed processing environment. Each process secures a list of elements and performs a first operation on an element of the list to produce a result corresponding to one of the processes. If the result corresponds to the process processing the element, the process performs a second operation on the element. Each process then processes the next element on the list until all the elements of the list are processed. After the process processes all the elements on the list it further processes each element remaining on the list and performs the second operation on the elements remaining on the list. In one implementation, the distributed processing environment is a peer-to-peer virtual storage system and each process runs on a controller controlling a plurality of storage systems.

38 Claims, 6 Drawing Sheets

U.S. PATENT DOCUMENTS

| | | | |
|---|---|---|---|
| 5,604,882 A | | 2/1997 | Hoover et al. |
| 5,642,503 A | * | 6/1997 | Reiter ............................. 707/8 |
| 5,692,135 A | | 11/1997 | Alvarez, II et al. |
| 5,742,807 A | * | 4/1998 | Masinter ......................... 707/1 |
| 5,745,690 A | * | 4/1998 | Holland et al. ............. 709/211 |
| 5,815,656 A | * | 9/1998 | Candelaria et al. ............ 714/54 |
| 5,826,078 A | * | 10/1998 | Funaki ......................... 718/100 |
| 5,845,274 A | * | 12/1998 | Chadha et al. .................. 707/2 |
| 5,884,308 A | * | 3/1999 | Foulston ......................... 707/8 |
| 5,893,120 A | * | 4/1999 | Nemes ......................... 707/206 |
| 5,913,216 A | * | 6/1999 | Kneuer et al. ............... 707/101 |
| 5,974,427 A | * | 10/1999 | Reiter .......................... 707/203 |
| 5,983,232 A | * | 11/1999 | Zhang ......................... 707/102 |
| 6,072,548 A | | 6/2000 | Schoner et al. |
| 6,078,931 A | * | 6/2000 | Motoyama .................. 707/203 |
| 6,115,802 A | * | 9/2000 | Tock et al. .................. 711/216 |
| 6,145,064 A | * | 11/2000 | Long et al. .................. 711/158 |
| 6,289,358 B1 | * | 9/2001 | Mattis et al. ................ 707/203 |
| 6,385,701 B1 | * | 5/2002 | Krein et al. ................. 711/141 |
| 6,694,434 B1 | * | 2/2004 | McGee et al. .............. 713/189 |
| 2003/0120932 A1 | * | 6/2003 | Epstein ........................ 713/181 |

OTHER PUBLICATIONS

"Introducing the IBM TotalStorage Virtual Tape Server", IBM Corp., 2001, pp. 1-22.

IBM Corp. "IBM TotalStorage Peer-To-Peer Virtual Taper Server" [online], 2001, pp. 1-3. [Retrieved on Nov. 2, 2001]. Retrieved from the Internet at URL: <http://www.storage.ibm.com/hardsoft/tape/3494_vts/prod_data/g225-6833.html >.

M. Werner, et al., "Magstar" Peer-to-Peer Virtual Tape Server Planning and Implementation Guide, IBM Corp., IBM document No. SG24-6115-00, 2000, Chap. 2, pp. 7-48.

* cited by examiner

METHOD, SYSTEM, AND PROGRAM FOR ALLOCATING TASKS TO A PLURALITY OF PROCESSORS

BACKGROUND OF THE INVENTION

1. Field of the Invention

The present invention relates to a method, system and program for a data storage environment.

2. Description of the Related Art

In prior art virtual tape storage systems, hard disk drive storage emulates tape drives and tape cartridges. For instance, host systems perform input/output (I/O) operations with respect to tape by performing I/O operations with respect to a set of hard disk drives that emulate the tape storage. In the prior art International Business Machines (IBM) Magstar** Virtual Tape Server, one or more virtual tape servers (VTS) are each integrated with a tape library comprising numerous tape cartridges and tape drives and have a direct access storage device (DASD) comprised of numerous interconnected hard disk drives. The DASD functions as a cache to volumes in the tape library. In VTS operations, the virtual tape server intercepts the host's requests to access a volume in the tape library and returns data for such requests from the DASD. If the volume is not in the DASD, then the virtual tape server recalls the volume from the tape drive to the DASD. The virtual tape server can respond to host requests for volumes in tape cartridges from DASD substantially faster than responding to requests for data from a tape drive. In this way, the DASD functions as a tape volume cache for volumes in the tape cartridge library.

**AIX, ESCON, Magstar, and RS/6000, OS/390, Tivoli are registered trademarks of IBM.

Two virtual tape servers can be combined to create a peer-to-peer virtual tape server system. In a peer-to-peer virtual tape server, two virtual tape servers, each integrated with a separate tape library and DASD, can provide access and storage for the same data volumes (i.e., peer-to-peer environment). In such peer-to-peer VTS systems, if an operation to recall a file from one virtual tape server subsystem and tape library fails, then the file may still be recalled from the other virtual tape server subsystem and tape library. This redundant architecture provides greater data and tape availability and improved data shadowing in the event a tape or VTS in one subsystem is damaged. Upon receiving a write request, a virtual tape controller connected to both virtual tape servers, will write the logical volume to only one of the virtual tape servers. In the VTS peer-to-peer system, virtual tape controllers receive host I/O requests and direct such requests to one of the VTS subsystems (an example of a virtual tape controller is the IBM AX0 Virtual Tape Controller ("VTC") which acts as an intelligent switch between the two virtual tape servers). Then, the VTC copies the logical volume from the virtual tape server that last received the write to the other virtual tape server. Many peer-to-peer configurations include more than one virtual tape controller to provide redundancy and no single point of failure. When one of the virtual tape controllers is off-line all host activity is directed to the remaining one or more virtual tape controllers. All virtual tape controllers in a Peer-to-Peer VTS, as a group elect one of the VTSs to be the focal point or master VTS of the Peer-to-Peer VTS and control the switchover to the other VTS, if the master VTS fails. The virtual tape controllers combine the status of the underlying physical libraries to provide a logical view of the peer-to-peer virtual tape system to the host. The virtual tape controllers are also referred in the art as intermediate controllers.

When one of the virtual tape servers in a peer-to-peer virtual tape server configuration is taken off-line for maintenance, routine service, or even a system upgrade, all activity will be directed to one of the remaining virtual tape servers. When the virtual tape server that was taken off-line returns to service, each of the virtual tape controllers will resume copy operations to bring the logical volume copies in both virtual tape servers back into synchronization.

A token is a data stored in the databases of both distributed VTSs, and is used to keep track of the level and status of each data set (e.g. a logical volume, also referred to as a virtual volume) within the Peer-to-Peer VTS. The tokens guarantee data integrity in the Peer-to-Peer VTS. In addition, token data is stored with each virtual volume when written onto physical tape. The token data for a virtual volume includes information that indicates whether a virtual volume resides in the DASD (tape volume cache) of the VTS or has already been copied to a stacked physical cartridge. The virtual tape controllers direct the mount request to the VTS with the cached copy of the volume in DASD to improve recall efficiency.

The token data for a virtual volume further includes information that indicates whether the distributed VTS contains a valid copy of a virtual volume. This prevents using an outdated version of a virtual volume. The process to compare tokens stored in each VTS to determine required copy updates and token synchronization is called token reconciliation. Token reconciliation is performed at power-up and at periodic intervals by the virtual tape controllers and may involve examining the internal fields of one or more data structures reflecting a token.

Notwithstanding, there is a need in the art for improved techniques for managing the tokens and performing token reconciliation.

SUMMARY OF THE PREFERRED EMBODIMENTS

Provided are a method, system, and program to allocate tasks among a plurality of processes within a distributed processing environment. Each process secures a list of elements. Each process performs a first operation on an element of the list to produce a result corresponding to one of the processes. In one implementation, the first operation comprises a hash operation on the element. If the result corresponds to the process processing the element, the process performs a second operation on the element. Each process then processes the next element on the list until all the elements of the list are processed. In one implementation after the process processes all the elements on the list, the process resecures the list and processes each element on the list by performing the second operation on the elements on the list. In one implementation, the second operation is performed only if the element being processed has not been modified by another process.

In one implementation, each element on the list indicates a time value of a data set in a first storage device and a second storage device, wherein the data set is maintained in both the first and second storage devices, and wherein the process performed during the second operation determines whether one of the first storage device or second storage device has a more current version of the data set and copies the data set from the first or second storage device having the more current version of the data set to the first or second storage device that does not have the more current version.

Further implementations describe a method, system, and program for maintaining a storage system wherein a plurality of controllers control a first and second storage devices and respond to requests from a host. The first and second storage devices maintain a plurality of data sets accessible by the controllers. A controller creates a list of elements wherein each element includes information on one data set. Each controller, performs a first operation on an element of the list to produce a result corresponding to one of the controllers. In one implementation, the first operation applies a hash function on the element, wherein the hash function maps to a hash value result that has an equal probability of corresponding to each of the controllers. Each controller then performs a second operation on the element, if the result corresponds to the controller processing the element. In one implementation, wherein each element on the list indicates a time value of a data set in the first storage device and the second storage device, wherein the data set is maintained in both the first and second storage devices, the second operation determines whether one of the first storage device or second storage device has a more current version of the data set and copies the data set from the first or second storage device having the more current version of the data set to the first or second storage device that does not have the more current version. Each controller then processes the next element on the list until all the elements are processed.

In further implementations, after the controller processes all the elements of the list, the controller again processes each element of the list and determines if another controller has modified the element being processed. If another controller has not modified the element being processed, then the controller determines whether one of the first storage device or second device has a more current version of the data set and copies the data set from the first or second storage device having the more current version of the data set to the first or second storage device that does not have the more current version. The controller then processes the next element on the list until all the elements are processed.

The described implementations allow a plurality of tasks to be allocated evenly among a group of processes. In particular, the implementations enable the distribution of tokens among virtual tape controllers in a manner such that no two virtual tape controllers attempt to reconcile the tokens of a volume at the same time. Collisions decrease among virtual tape controllers and as a result the system performs token reconciliation faster than prior art methods.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
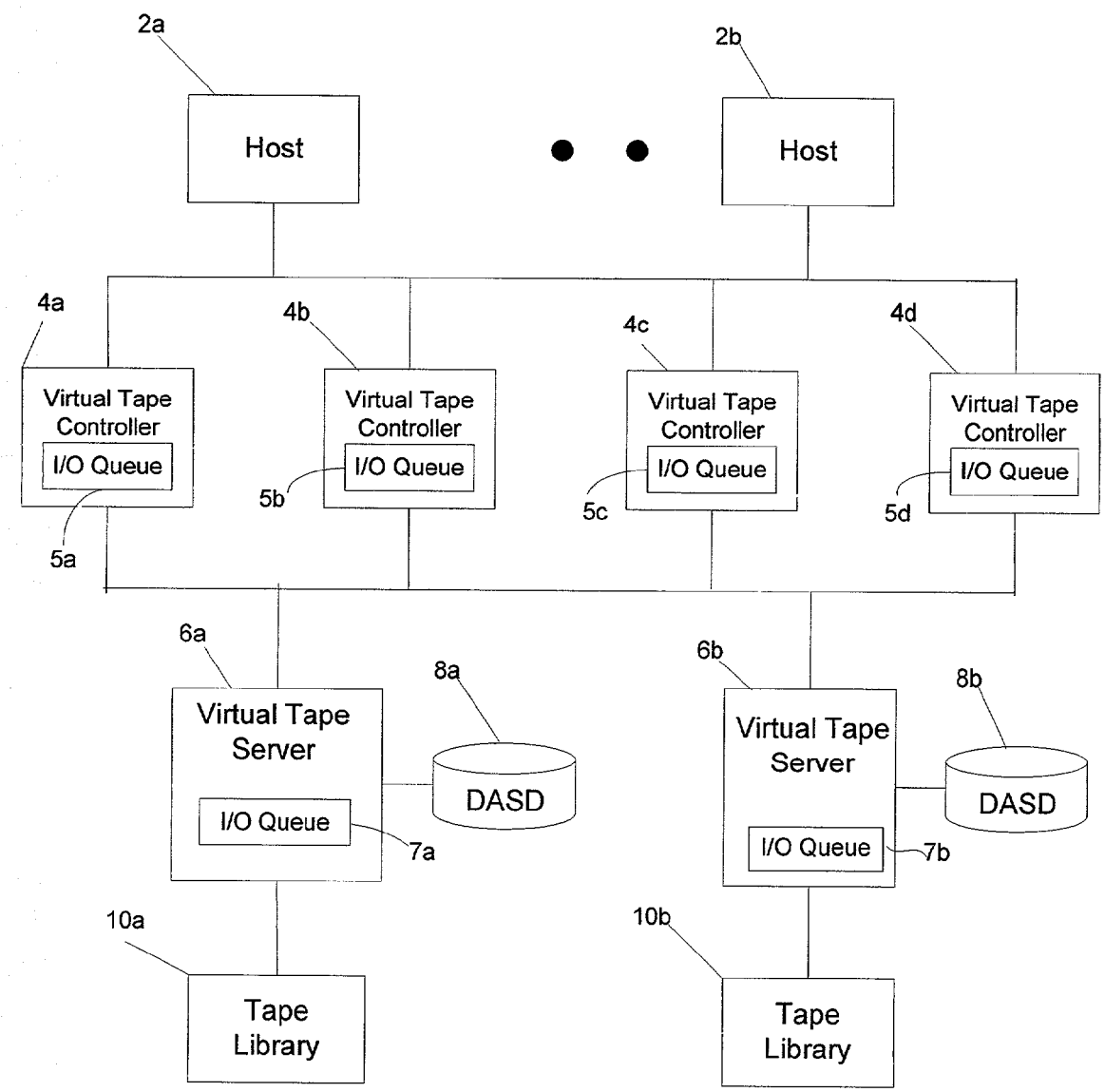
FIG. 1 is a block diagram illustrating a computing environment in which aspects of the invention are implemented.

In the following description, reference is made to the accompanying drawings which form a part hereof and which illustrate several implementations of the present invention. It is understood that other implementations may be utilized and structural and operational changes may be made without departing from the scope of the present invention.

Prior Art Techniques for Token Reconciliation

In prior art systems, each virtual tape server stores the data (known as a token) required to keep track of the status of a data set (virtual volume). Since each virtual tape server contains copies of all the virtual volumes, the number of tokens each virtual tape server stores equals the number of virtual volumes. The virtual tape server stores these tokens in a VTS token list. Thus, a set of tokens for the volumes is maintained at each virtual tape server.

If a virtual tape server goes off-line for a while and then subsequently rejoins the peer-to-peer VTS system, then the token corresponding to the copy of the virtual volume stored on the off-line virtual tape server may not reflect the most recent update of the virtual volume on one of the other virtual tape servers. Subsequently, the virtual tape controller copies and thereby updates the volumes at the virtual tape servers that need to be updated.

For token reconciliation, each virtual tape controller constructs a list of elements, also referred to as a VTC list of tokens, from the VTS token lists. Each element of the VTC list of tokens corresponds to the tokens of a virtual volume. All the virtual tape controllers start roughly at the same time with their own VTC list of token, where the VTC lists of tokens are identical. All the virtual tape controllers simultaneously begin a process to reconcile the tokens corresponding to a virtual volume by processing each element of the VTC list of tokens.

When multiple virtual tape controllers attempt to simultaneously process the same element of the VTC list of tokens, a collision occurs. Similarly, when a virtual tape controller attempts to reconcile a token that has already been reconciled by another virtual tape controller a collision occurs. When a collision occurs during the processing of an element, the virtual tape controller does not perform any useful activity for the tokens corresponding to the element. The virtual tape controller experiencing the collision then skips the current element where the collision occurred and processes the next element. Since each virtual tape controller operates on an identically ordered list of elements there are many collisions in the processing of these elements among the virtual tape controllers. System performance is adversely effected when the virtual tape controllers devote time and resources engaged in collisions.

For this reason, there is a need in the art to design a technique for token reconciliation that reduces the number of collisions experienced by the processors processing the VTC list of tokens.

Processing a List with Multiple Processes

FIG. 1 illustrates a peer-to-peer computing environment utilizing two virtual tape servers 6a, 6b. Additional virtual tape servers can be used by a system, but for purposes of illustration, a single peer-to-peer arrangement is shown. A plurality of host computers 2a, 2b (two host computers 2a, 2b are shown for illustration purposes) connect to four virtual tape controllers ("VTC") 4a, 4b, 4c, 4d. The virtual tape controllers can be two or more in number, although for illustration purposes four virtual tape controllers are shown. The host computers 2a, b may connect to the VTCs 4a, 4b, 4c, 4d through a channel, such as the Enterprise System Connection (ESCON)** channel or any other switching mechanism known in the art (e.g. fibre channel, Storage Area Network (SAN) interconnections etc.). In the peer-to-peer environment, the virtual tape controllers 4a, 4b, 4c, 4d are transparent to the host computers 2a, 2b (i.e. the host system acts as if the host computers 2a, b are writing to a single virtual tape server). One of the virtual tape controllers 4a, 4b, 4c, 4d routes I/O requests from the hosts 2a, 2b to one of the virtual tape servers 6a or 6b. The virtual tape controllers 4a, 4b, 4c, 4d include I/O queues, 5a, 5b, 5c, 5d, respectively, in which the virtual tape controllers 4a, 4b, 4c, 4d queue I/Os to route among the virtual tape servers 6a, 6b and hosts 2a, 2b, using I/O priority queuing techniques known in the art. Each virtual tape server 6a, 6b includes a queue 7a, 7b in which I/O requests being transferred between the other virtual tape server 6a, 6b or the hosts 2a, b are queued using I/O priority queuing techniques known in the art. In addition, the virtual tape servers 6a and 6b control access to direct access storage devices (DASD) 8a and 8b and tape libraries 10a and 10b, respectively.

**AIX, ESCON, Magstar, and RS/6000, OS/390, Tivoli are registered trademarks of IBM.

Each DASD 8a, 8b comprises numerous interconnected hard disk drives. Each tape library 10a, 10b comprises numerous tape cartridges which may be mechanically loaded into tape drives that the virtual tape servers 6a, 6b may access. The hosts 2a, 2b may include an operating system known in the art, such as the IBM OS/390 operating system. The virtual tape servers 6a or 6b may comprise a server system including software to emulate a tape library, such as the IBM Magstar Virtual Tape Server. For instance, the virtual tape servers 6a, 6b and the virtual tape controller s 5a, 5b, 5c, 5d may be implemented in separate computers comprising an IBM RS/6000 processor, the IBM AIX operating system, and the IBM ADSTAR Distributed Management (ADSM) software or Tivoli Storage Manager to perform the data movement operations among the hosts 2a, 2b, DASDs 8a, 8b, and tape libraries 10a, 10b. The tape library may comprise an IBM Magstar Tape Library, such as the Magstar 3494 Tape Library, or any other tape library system known in the art.

**AIX, ESCON, Magstar, and RS/6000, OS/390, Tivoli are registered trademarks of IBM.

The DASDs 8a, 8b provide a tape volume cache, which extends the performance benefits of disk cache to access the volumes in the tape libraries 10a, b and improves performance by allowing host I/O requests to the tape libraries 10a, b to be serviced from the faster-access DASDs 8a, b. The virtual tape servers 6a, 6b appear to the hosts 2a, 2b as tape drives including tape data volumes. The hosts 2a, 2b view the virtual tape volumes as actual tape volumes and issue tape management commands, such as mount, and otherwise address the virtual tape servers 6a, 6b as a tape control unit. Further details of the virtual tape server and virtual tape controller technology are described in the IBM publication "Magstar** Peer-to-Peer Virtual Tape Server Planning and Implementation Guide," IBM document no. SG24-6115-00 (Copyright IBM, 2000), which publication is incorporated herein by reference in its entirety.

**AIX, ESCON, Magstar, and RS/6000, OS/390, Tivoli are registered trademarks of IBM.

Volumes maintained in tape cartridges in the tape library 10a, 10b are logical (also known as virtual) volumes. A copy of the logical volume can also reside in the DASD 8a, 8b associated with the virtual tape servers 6a, 6b. A host 2a, 2b accesses the data on a logical volume from the resident copy in the DASD 8a, 8b. If the DASD 8a, 8b resident copy is updated by a host 2a, 2b, then the virtual tape server 6a, 6b schedules to copy the logical volume from the DASD 8a, 8b to the tape library 10a, 10b, closes the volume, and then flags the volume as uncopied data that must be copied to the other virtual tape server 6a, 6b. Further, if the DASD's 8a, 8b space usage reaches a threshold amount, then the virtual tape server 6a, 6b removes logical volumes that have been copied to the tape library 10a, 10b from the DASD 8a, 8b to make room for further logical volumes. Once a logical volume has been removed from the DASD 8a, 8b, it is no longer accessible to a host 2a, 2b. If a host 2a, 2b requests a volume that only resides on tape, then the VTS must recall and copy the volume from a tape in the tape library 10a, 10b to the DASDs 8a, b. Recall operations can take several minutes and may include mechanical operations involving the use of a robotic arm to access tape cartridges from the storage cells and insert into a tape drive, mount the tape cartridge, rewind the tape, etc. In certain implementations, the tape libraries 10a, 10b include the same logical volumes, thus shadowing each other. However, each virtual tape server 6a, 6b behaves independently, and each may cache different volumes in DASD. For instance, the virtual tape servers 6a, 6b may have different volumes resident in their associated DASDs 8a, 8b as a result of different schedules or algorithms that determine which volumes to remove.

Figure 2:
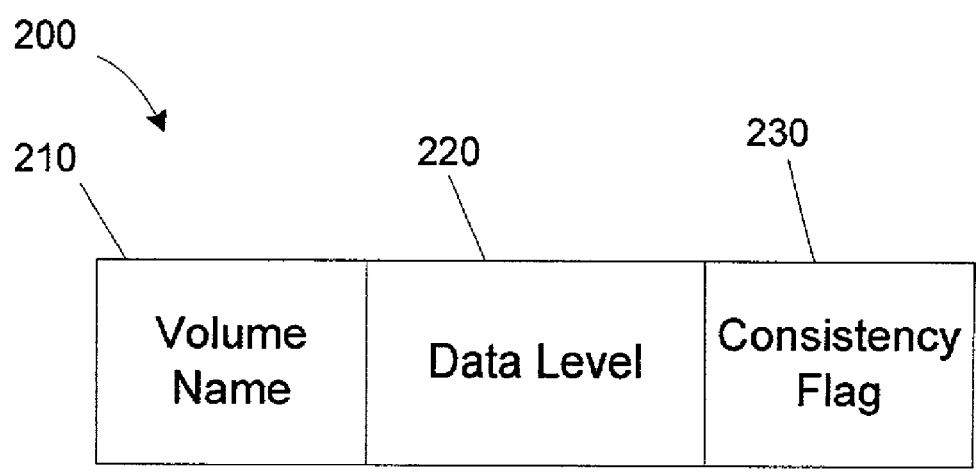
FIG. 2 illustrates a token database record used to access data in accordance with implementations of the invention.

Each virtual tape server 6a, 6b includes a database of tokens or records for every logical volume in the tape library 10a, 10b to manage the volumes in the virtual tape servers 6a, 6b. FIG. 2 illustrates the fields or data maintained in each token 200. The volume name 210 indicates the name of the volume represented by the token. The volume name 210 is unique to each volume and can alternately be represented as volume ID or volume serial number. A data level 220 indicates the number of times the volume having volume name 210 has been updated in the virtual tape server. Every time data is updated to a logical volume, the data level 200 field is incremented indicating the number of times a volume in a particular DASD 8a, 8b has been updated. The logical volume in the DASDs 8a, 8b having the highest data level includes the most recent version of the update. For this reason, the virtual tape server 6a, 6b including the most recent version of the data, i.e., having the highest level, will be selected when performing I/O operations with respect to the volume. A consistency flag 230 records whether the volume data is consistent or not. Every time data is updated to a virtual tape server 6a, 6b, the tokens are updated. On the virtual tape server to which data is updated the token data level 220 is advanced. On the other virtual tape server the consistency flag 230 field is set to FALSE to indicate that the data on the volume on that virtual tape server 6a, 6b is not current. In addition to the volume name 210, data level 220, and consistency flag 230, there may be other fields within token 200.

Figure 3:
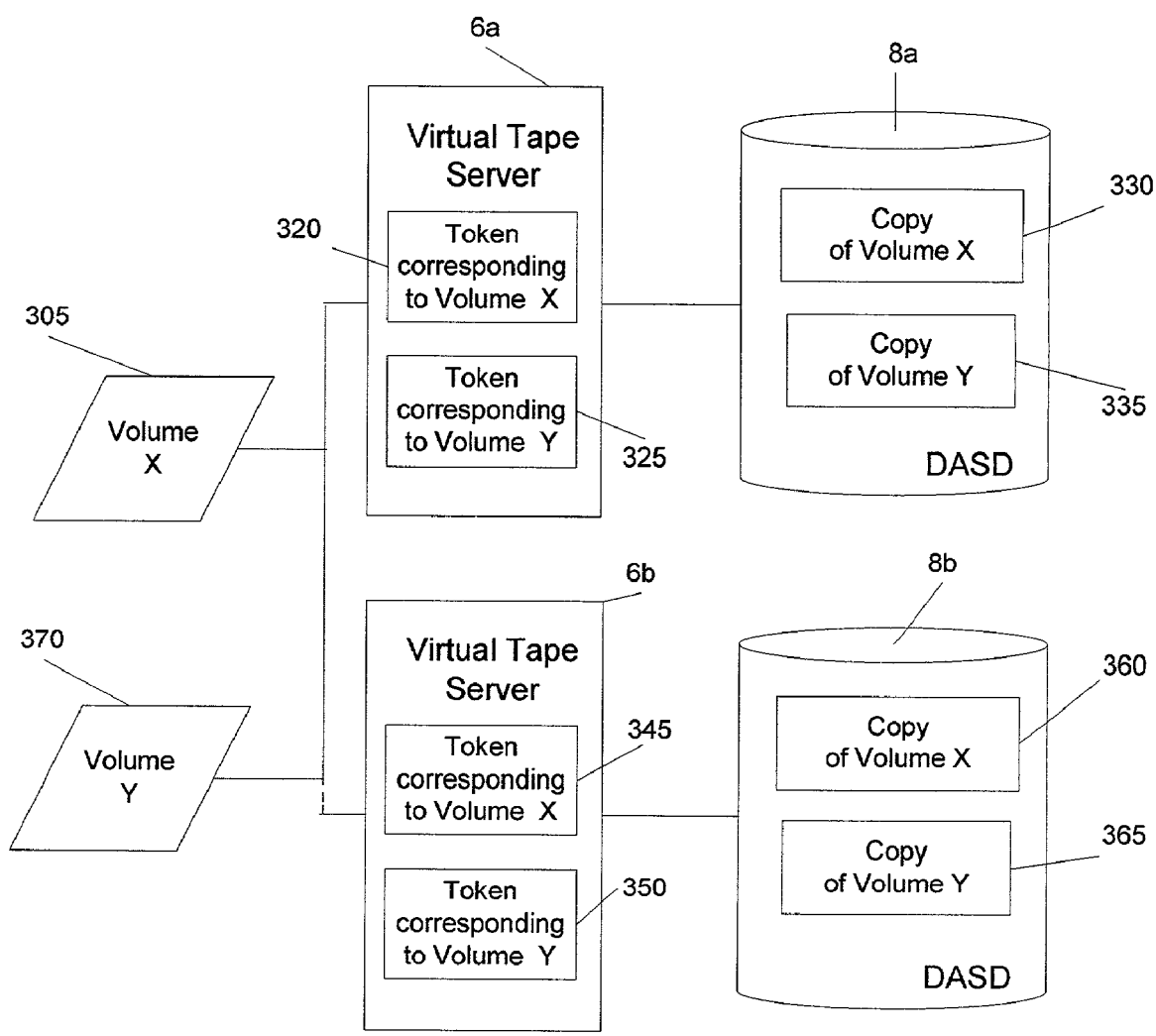
FIG. 3 illustrates how tokens are mapped to volumes in accordance with implementations of the invention.

FIG. 3 illustrates how tokens are mapped to volumes in accordance with implementations of the invention. Consider two volumes, volume X (denoted by reference numeral 305) and volume Y (denoted by reference numeral 370) that can be accessed by hosts 2a and 2b of FIG. 1. Corresponding to volume X 305 there is a token 320 in virtual tape server 6a, and a token 345 in virtual tape server 6b. In addition a copy 320 of volume X is stored in DASD 8a, and a copy 360 of volume X is stored in DASD 8b. Similarly, corresponding to volume Y 370 there is a token 325 in virtual tape server 6a, and a token 350 in virtual tape server 6b. In addition a copy 335 of volume Y is stored in DASD 8a, and a copy 365 of volume Y is stored in DASD 8b. In FIG. 3, the tokens 320, 325, 345, 350 have been shown in the virtual tape servers (possibly resident in main memory). Additionally, the tokens can also reside in the DASDs 8a,8b. Thus for every volume there is a corresponding token in each of the virtual tape servers 6a, 6b. However, while FIG. 3 shows that the copy of each volume exists in the DASDs 8a, 8b that need not always be the case. Sometimes the copy of a volume may exist only in the tape library 10a,10b and not in the DASDs 8a,8b.

Figure 4:
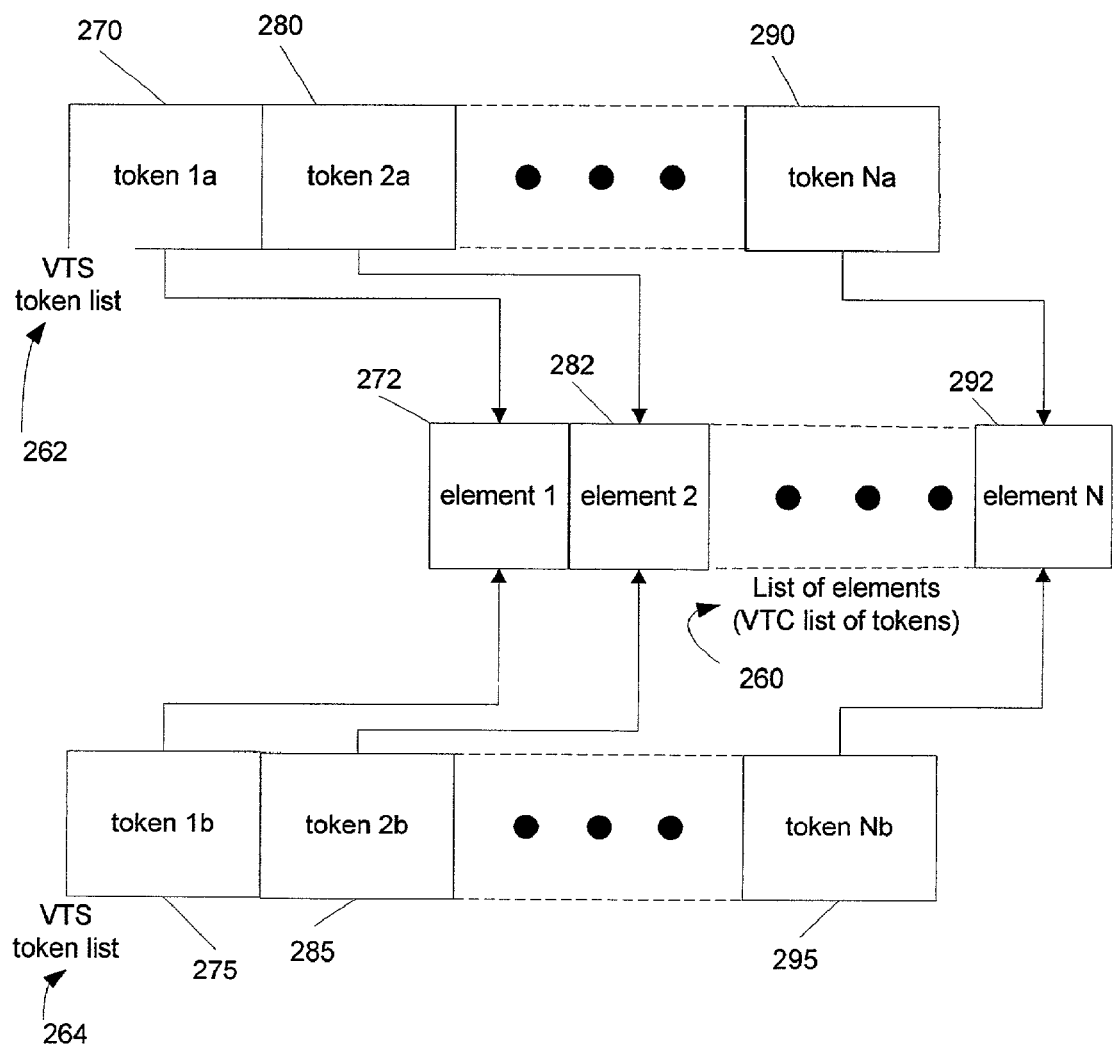
FIG. 4 illustrates various lists in virtual tape servers and virtual tape controllers in accordance with implementations of the invention.

FIG. 4 illustrates various lists in the virtual tape servers and virtual tape controllers in accordance with implementations of the invention. Virtual tape server 6a contains VTS token list 262, virtual tape server 6b contains VTS token list 264 and each of the virtual tape controllers 4a, 4b,4c, and 4d contain a list of elements 260 also referred to as the VTC list of tokens 260. If there are N volumes, 1 through N, then token 1a (denoted by reference numeral 270), token 2a (denoted by reference numeral 280), through token Na (denoted by reference numeral 290) are the tokens corresponding to the N volumes in virtual tape server 6a. Similarly token 1b (denoted by reference numeral 275), token 2b (denoted by reference numeral 285), through token Nb (denoted by reference numeral 295) are the tokens corresponding to the N volumes in virtual tape server 6b. Token 1a and token 1b may collectively be referred to as element 1 or token 1 in Virtual tape controllers 6a, 6b, 6c, 6d. Generalizing, token 1a, and 1b can be collectively referred to as element i or token i. The VTC list of tokens 260 has N elements, element 1 (denoted by reference numeral 272), element 2 (denoted by reference numeral 282), through element N (denoted by reference numeral 292). Each of the elements on the VTC list of tokens 260 may contain pointers to the VTS token lists 262, 264 and references the tokens of a virtual volume.

Figure 5:
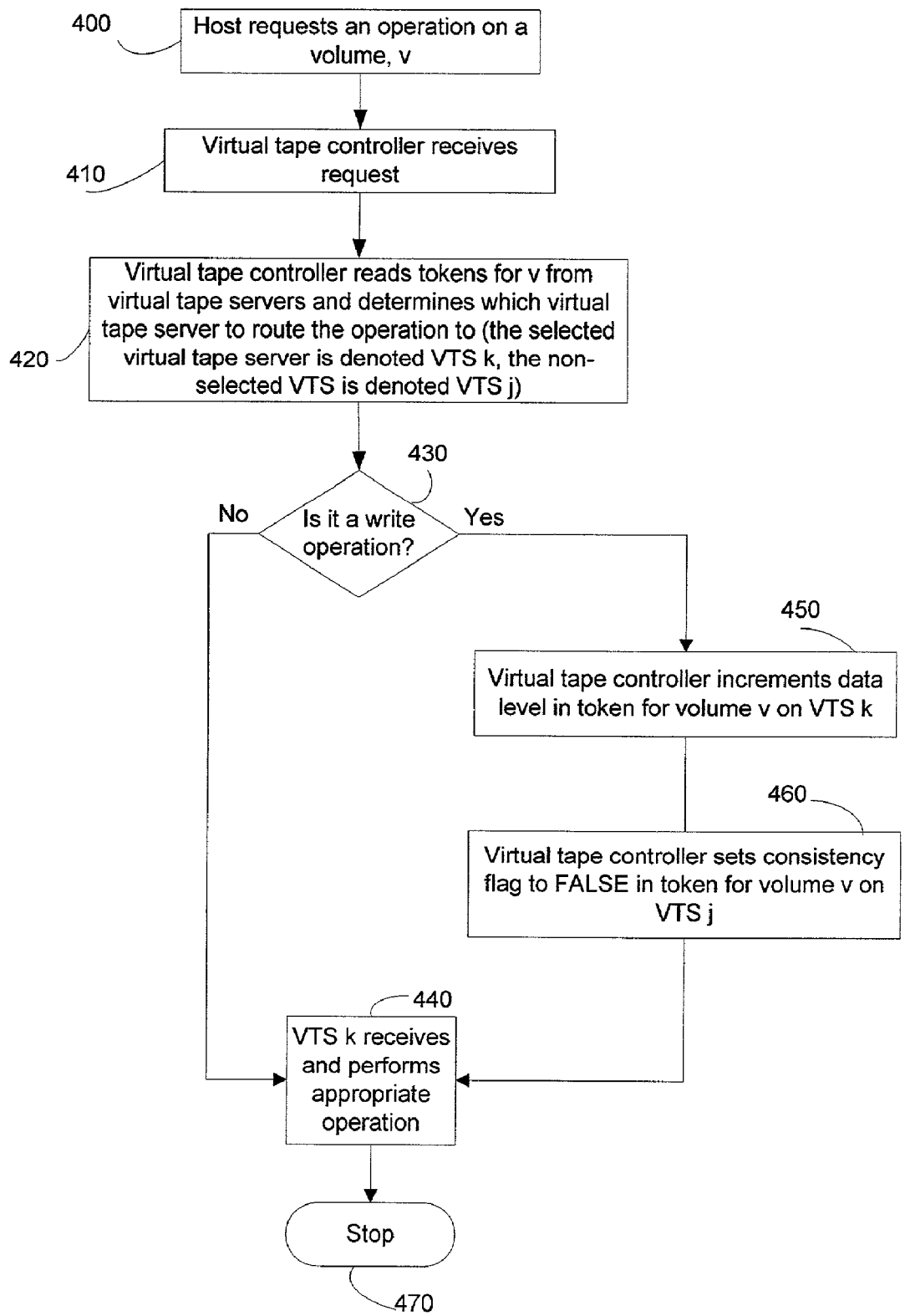
FIG. 5 illustrates logic used to change the internal fields of tokens in accordance with implementations of the invention.

FIG. 5 illustrates logic implemented in the hosts 2a, 2b, VTCs 4a, b, c, d, and virtual tape servers 6a, 6b to change the internal fields of tokens in accordance with implementations of the invention. Host 2a requests (at block 400) an operation on a volume, v. One of the virtual tape controllers 4a, 4b, 4c, 4d receives (at block 410) the request. Control proceeds to block 420, where the virtual tape controller receiving the request reads tokens for volume v from the virtual tape servers 6a, 6b and determines which virtual tape server to route the operation to. The virtual tape server selected to route the request to is denoted by VTS k (reference numeral 6a) and the non-selected virtual tape server is denoted by VTS j (reference numeral 6b).

Subsequently the virtual tape server, k determines (at block 430) whether the request is a write operation to a volume. If the request is a write operation, then the virtual tape controller that received the request at block 410, increments (at block 450) the data level 220 for token 200 corresponding to volume v on VTS k. For example, with reference to FIG. 3 if host 2a makes a write request for volume X 305, that is transmitted to virtual tape controller 4a, then the virtual tape controller 4a increments the data level 220 of token 320 corresponding to volume v on VTS k 6a. The virtual tape controller sets (at block 460) the consistency flag 230 for token 200 to be false. Subsequently the process comes (at block 470) to a stop. If at block 430, the request is not a write operation, then the system performs (at block 440) the appropriate operations and comes (at block 470) to a stop.

While not shown in FIG. 5, the host 2a can request a read operation on volume to a virtual tape controller 4a, 4b, 4c, 4d. The virtual tape controller 4a, 4b, 4c, 4d interacts with the virtual tape servers 6a, 6b to determine which of the virtual tape servers 6a, 6b contains the highest data level within the token for the volume. If the copy of the volume is found in the DASD 8a, 8b it is returned to the host. If the copy of the volume is not found in DASD, then the virtual tape server 6a, 6b recalls and copies the volume from a tape in the tape library 10a, 10b to the DASD 8a, 8b and the volume is sent to the host 2a.

Figure 6:
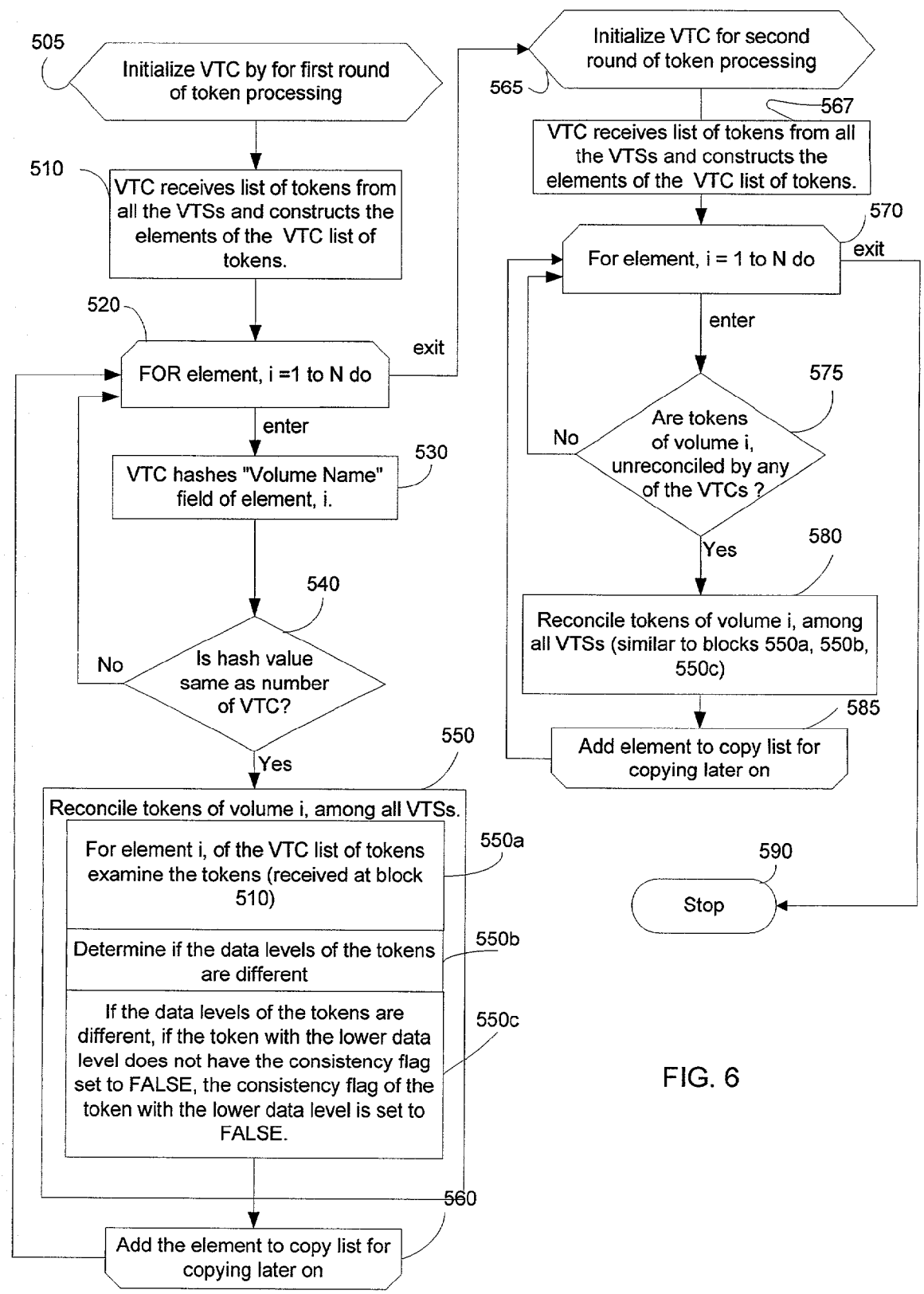
FIG. 6 illustrates logic to perform token reconciliation in accordance with implementations of the invention.

FIG. 6 illustrates logic implemented in the VTCs 4a, 4b, 4c, and 4d to perform token reconciliation in accordance with implementations of the invention. All the virtual tape controllers 4a, 4b, 4c, 4d perform the logic of FIG. 6 in parallel. FIG. 6 shows the process only for one particular virtual tape controller 4a, 4b, 4c, 4d out of the virtual tape controllers 4a, 4b, 4c, 4d. Before executing the logic of FIG. 6 each virtual tape controller 4a, 4b, 4c, 4d is assigned a distinct number ranging from 1 to the number of virtual tape controllers (e.g. Virtual tape controllers 4a, 4b, 4c, 4d are assigned the numbers 1, 2, 3, 4, respectively). At block 505, the virtual tape controller 4a initializes for the first round of token processing. Each virtual tape controller 4a, 4b, 4c, 4d receives independently (at block 510) the VTS token lists 262, 264 from all the virtual tape servers, 6a,b and constructs the VTC list of tokens 260 as described earlier in FIG. 4. As described above, there are N elements in the VTC list of tokens 260 (FIG. 4) identified as element 1 through element N. Block 520 indicates the control of the FOR loop for token processing where each of the elements 1 through N are processed one after another. Each VTC 4a, 4b, 4c, 4d performs the steps at blocks 520 through 560 for each element i, where i varies from 1 through N. Each virtual tape controller 4a, 4b, 4c, 4d hashes (at block 530) the volume name 210 field of any of the tokens pointed to by element i. A number of hash functions known in the art can be used for hashing. The result of applying the hash function on the volume name field 210 is an integer that varies from 1 through the number of virtual tape controllers. In certain implementations, the hash function is chosen in a manner such that there is roughly equal probability for the hash value result being any of the digits between 1 through the number of virtual tape controllers.

At block 540, virtual tape controller 4a, 4b, 4c, 4d determines if the hash value (i.e. the result of applying the hash function) maps to the distinct number assigned to the virtual tape controller 4a, 4b, 4c, 4d. The mapped virtual tape controller reconciles (at block 550) the tokens corresponding to volume i. While reconciling tokens of volume i, the virtual tap controller 4a,4b,4c,4d first examines (at block 550a) the tokens corresponding to volume i, received at block 510 from the virtual tape servers 6a,6b from the VTS token lists 262, 264. From the tokens in the VTS token lists 262, 264 the virtual tape controller 4a, 4b, 4c, 4d determines (at block 550b) if the data levels of the tokens are different. If so, then at block 550c if the token with the lower data level does not have the consistency flag set to FALSE, the consistency flag of the token with the lower data level is set to FALSE. Collisions with other virtual tape controllers do not occur during the setting of the consistency flag because the token corresponding to volume i is processed only by one virtual tape controller as the hashing scheme divided the tokens for reconciliation among the virtual tape controllers. With the described implementations, the processing of the lists are improved because collisions are avoided.

At block 560, the token i, is added to a copy list for copying and updating volumes among virtual tape servers, under the control of the mapped virtual tape controller. The copying and updating of volumes take place at a later time. If at block 540, the hash value does not map to the virtual tape controller executing the logic of FIG. 6, control returns to block 520 and the next element is processed.

If all elements are processed (at block 520) the FOR loop exits and processing proceeds to block 565 where the virtual tape controller 4a, 4b, 4c, 4d is initialized for a second round of token processing. When block 565 is executed by a virtual tape controller, all the other virtual tape controllers have performed a first round of token processing. Often during the process of the first round of token processing, one or more of the virtual tape controllers may go off-line. When a virtual tape controller goes off-line while reconciling tokens, the tokens assigned (via the hash functions) to the off-line virtual tape controller during the first round of token processing are unreconciled. Hence at the conclusion of the first round of token processing there may still be unreconciled tokens. The second round of token processing is performed in order to reconcile any unreconciled tokens.

At the conclusion of the logic of block 565, control proceeds to block 567 where each virtual tape controller 4a, 4b, 4c, 4d receives independently the VTS token lists 262, 264 from all the virtual tape servers, 6a,b and constructs the VTC list of tokens 260 as described earlier in FIG. 4 (this is also similar to the operation of block 510).

In the second round for token processing, the VTCs 4a, 4b, 4c, 4d performs a loop at blocks 570 through 585 for each element, 1 through N, on the list of tokens 260. At block 575, the virtual tape controller 4a, 4b, 4c, 4d determines whether the token corresponding to volume i is unreconciled by any of the virtual tape controllers. If token i is unreconciled, then the virtual tape controller 4a, 4b, 4c,4d reconciles (at block 580) the tokens for volume i, among all the virtual tape servers in a manner similar to blocks 550a, 550b, 550c. Subsequently, in block 585, the virtual tape controller 4a, 4b, 4c, 4d adds token i to a copy list for copying and updating volumes among virtual tape servers etc. The copying and updating of volumes take place at a later time. If at block 575, token i is already reconciled, then control returns to block 570 and the next token is processed. When all tokens in the tokens 1 through N in the list of tokens 260 have been processed in block 570 the FOR loop exits and the system for token reconciliation ends (at block 590) for virtual tape controllers 4a, 4b, 4c, 4d. In performing the second round of processing, collision may occur if one VTC 4a, 4b, 4c, 4d attempts to reconcile a token that is in the process of being reconciled by another VTC. However, because the bulk of the tokens have been reconciled during the first pass through the list, the number of collisions when going through the second pass is lessened.

The implementations distribute the elements of the VTC list of tokens among the virtual tape controllers in a manner such that no two virtual tape controllers attempt to reconcile the tokens of a volume associated with the element of the VTC list of tokens. Collisions decrease among virtual tape controllers and as a result the system performs token reconciliation faster than prior art methods.

Additional Implementation Details

The technique for token reconciliation may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which token reconciliation is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Although the implementations have been described in the context of a virtual storage system, variations of the implementations apply to any distributed processing environment where tasks have to divided among multiple processes (executing in one or more processors) for load balancing. The technique for processing a list of elements can apply to the elements of any ordered list, and is not limited to token reconciliation in a virtual tape server system. The elements processed can provide any type of data or information, such as tasks of work to be performed. In certain implementations, the list comprises an ordered list of elements, where each element has a unique key. The processes will only process those elements whose key or value maps to an identifier of the process. The described implementations apply in cases whenever independent processes separately process entries in the same list.

In the described implementations, each controller performed a second pass on the list to process any unreconciled tokens. In alternative implementations, each process may only perform a single pass.

In the described implementations, four virtual tape controllers and two virtual tape servers were shown. However, systems for token reconciliation can be constructed with four or more virtual tape controllers and two or more virtual tape servers.

Implementations were described with respect to the IBM Peer-to-Peer Virtual Tape Server system. However, the preferred logic could apply to any virtual storage system including magnetic storage or memories when used to cache data from a slower storage system. For instance, the cache may comprise memory devices and the storage devices may comprise sets of hard disk drives whose data sets are paged into the corresponding memory sets to provide access to the data sets through the faster access cache. Moreover, although the implementations were described with respect to a peer-to-peer environment, the preferred logic could apply to other environments such as a client-server environment where copies of the same data is kept at both locations. In addition, the preferred logic could apply to a situation where a copy of the logical volume can be kept in multiple storage devices. For example, the logic can apply in a peer-to-peer-to-peer environment with three separate virtual tape servers where the same logical volume is copied to each virtual tape server.

The processes that process the list of elements may comprise processes executed by one or more processors. Additionally, the reconcile operation may involve different types of checking between tokens and perform whatever operations are necessary to reconcile the tokens.

Although the implementations were described with reference to the implementation where the copy process from the copy list is performed in deferred mode, the preferred logic is also effective in the immediate mode where after reconciling a token, the token is added to a copy list and the appropriate files immediately copied.

In the above described implementations, virtual tape controllers were used to select a virtual tape server to handle the recall or I/O access operation. In alternative implementations, the hosts may make such a selection, or the virtual tape servers may determine which virtual tape server to use to handle the recall or access operation.

In the above described implementations, certain operations were discussed as performed by the virtual tape controller and the virtual tape server. In alternative implementations, certain of the operations described with respect to the virtual tape controller may be performed by the virtual tape server, and vice versa.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A computer implemented method for allocating tasks among a plurality of processes, comprising:
   providing a list of elements; and
   processing, with each process, each element on the list by:
      (i) performing a first operation on the element to produce a value that maps the element to one of the plurality of processes;
      (ii) performing a second operation on the element if the produced value maps to the process that is processing the element; and
      (iii) processing the next element on the list until all the elements are processed, wherein performing the second operation on each element further comprises determining whether one of a first storage device or a second storage device has a more current version of a data set.

2. The method of claim 1, wherein each element on the list indicates a time value of a data set in a first storage device and a second storage device.

3. The method of claim 1, wherein the first operation is designed to produce values that have an equal probability of mapping to each of the processes.

4. The method of claim 3, wherein the first operation comprises a hash operation on the element.

5. The method of claim 1, further comprising:
   removing the element from the list after performing the second operation on the element.

6. The method of claim 5, for each process, after the process processes all the elements on the list, further performing:
   resecuring the list, wherein the resecured list excludes those elements that have been removed from the list by the plurality of processes;
   processing each element remaining on the resecured list; and
   performing the second operation on the elements on the resecured list.

7. The method of claim 6, wherein processing each element remaining on the resecured list further comprises:
   determining if another process has reconciled the element being processed, wherein the second operation is performed only if the element being processed has not been reconciled by another process.

8. The method of claim 1, wherein each element on the list indicates a time value of a data set in a first storage device and a second storage device, wherein the data set is maintained in both the first and second storage devices, and wherein determining whether one of the first storage device or the second storage device has a more current version of the data set is performed by comparing the time value of the data set in the first storage device indicated by the element and the time value of the data set in the second storage device indicated by the element, and wherein performing the second operation on each element further comprises:
   copying the data set from the first or second storage device having the more current version of the data set to the first or second storage device that does not have the more current version.

9. The method of claim 8, wherein each element on the list includes a first token and a second token indicating a time value of the data set on the first and second storage devices, respectively, wherein determining whether one of the first or second storage device has the more current version further comprises:
   comparing the time value for the data set in the first and second token to determine if the time value is greater in one of the tokens.

10. The method of claim 9, wherein a controller controls the first and the second storage devices, the method further comprising:
    generating, at the controller, an updated token including the time value of the most current version of the data set on the first and second storage devices.

11. The method of claim 9, further comprising:
    retrieving the first and second tokens from first and second servers managing the first and second storage devices, respectively.

12. The method of claim 11, wherein a controller controls the first and the second servers that manage the first and the second storage devices respectively, the method further comprising
    generating, at the controller, an updated token including the time value of the most current version of the data set on the first and second storage devices; and
    transmitting the updated token to the first and second servers.

13. A method for maintaining a storage system wherein a plurality of controllers control first and second storage devices and respond to requests from a host, comprising:
    maintaining data accessible by the controllers in the first and the second storage devices, wherein the data in the first and the second storage devices is accessible to at least one of the controllers, and wherein the data is comprised of a plurality of data sets;

creating a list of elements wherein each element includes information on one data set of the plurality of data sets;

processing, with each controller, each element on the list by:
(i) performing a first operation on the element to produce a value that maps to one of the controllers;
(ii) performing a second operation on the element if the produced value maps to the controller that is processing the element; and
(iii) processing the next element on the list until all the elements are processed, wherein performing the second operation on each element further comprises determining whether one of the first storage device or the second storage device has a more current version of a data set.

14. The method of claim 13, wherein each element on the list indicates a time value of a data set in the first storage device and the second storage device.

15. The method of claim 13 wherein performing the first operation to produce the result further comprises:
applying a hash function on the element wherein the hash function maps to a hash value that has an equal probability of corresponding to each of the controllers, and wherein the hash value is the result.

16. The method of claim 13, wherein each element on the list indicates a time value of a data set in the first storage device and the second storage device, wherein the data set is maintained in both the first and second storage devices, and wherein determining whether one of the first storage device or the second storage device has a more current version of the data set is performed by comparing the time value of the data set in the first storage device indicated by the element and the time value of the data set in the second storage device indicated by the element, and wherein performing the second operation on each element further comprises:
copying the data set from the first or second storage device having the more current version of the data set to the first or second storage device that does not have the more current version.

17. A computer system for allocating tasks, comprising:
a plurality of processes;
means for providing a list of elements; and
means for processing with each process, wherein the means for processing processes each element on the list by:
(i) performing a first operation on the element to produce a value that maps the element to one of the plurality of processes;
(ii) performing a second operation on the element if the produced value maps to the process processing the element; and
(iii) processing the next element on the list until all the elements are processed, wherein each element on the list indicates a time value of a data set in a first storage device and a second storage device, and wherein performing the second operation on each element further comprises determining whether one of the first storage device or the second storage device has a more current version of the data set.

18. The computer system of claim 17, wherein each element indicates a task to perform, wherein the first operation comprises a hash operation on the element and is designed to produce values that have an equal probability of mapping to each of the processes, and wherein the second operation comprises performing the task indicated by the element, and the means for processing further performing:
removing the element from the list after performing the second operation on the element.

19. The computer system of claim 18, wherein for each process after the process processes all the elements on the list, further performing:
resecuring the list, wherein the resecured list excludes those elements that have been removed from the list by the plurality of processes;
processing each element remaining on the resecured list; and
performing the second operation on the elements on the resecured list.

20. The computer system of claim 17, wherein the data set is maintained in both the first and second storage devices, and wherein determining from the time value of the data set whether one of the first storage device or the second storage device has a more current version of the data set is performed by comparing the time value of the data set in the first storage device indicated by the element and the time value of the data set in the second storage device indicated by the element, and wherein performing the second operation on each element further comprises:
copying the data set from the first or second storage device having the more current version of the data set to the first or second storage device that does not have the more current version.

21. A system for maintaining a storage system, the system comprising:
a first storage device;
a second storage device;
a plurality of controllers controlling the first and the second storage devices, wherein the controllers respond to requests from a host;
means for maintaining data accessible by the controllers in the first and the second storage devices, wherein the data in the first and the second storage devices is accessible to at least one of the controllers, and wherein the data is comprised of a plurality of data sets;
means for creating a list of elements wherein each element includes information on one data set of the plurality of data sets;
means for processing, with each controller, each element on the list by:
(i) performing a first operation on the element to produce a value that maps to one of the controllers;
(ii) performing a second operation on the element if the produced value maps to the controller that is processing the element; and
(iii) processing the next element on the list until all the elements are processed, wherein each element on the list indicates a time value of a data set in the first storage device and the second storage device, and wherein performing the second operation on each element further comprises determining whether one of the first storage device or the second storage device has a more current version of the data set.

22. The system of claim 21, wherein the data set is maintained in both the first and second storage devices, and wherein determining whether one of the first storage device or the second storage device has a more current version of the data set is performed by comparing the time value of the data set in the first storage device indicated by the element and the time value of the data set in the second storage device indicated by the element, and wherein performing the second operation on each element further comprises:

copying the data set from the first or second storage device having the more current version of the data set to the first or second storage device that does not have the more current version.

23. A computer readable medium including code for allocating tasks among a plurality of processes, wherein the code causes operations on a machine, the operations comprising:

providing a list of elements; and
processing, with each process, each element on the list by:
(i) performing a first operation on the element to produce a value that maps the element to one of the plurality of processes;
(ii) performing a second operation on the element if the produced value maps to the process that is processing the element; and
(iii) processing the next element on the list until all the elements are processed, wherein performing the second operation on each element further comprises determining whether one of a first storage device or a second storage device has a more current version of a data set.

24. The computer readable medium of claim 23, wherein each element on the list indicates a time value of a data set in a first storage device and a second storage device.

25. The computer readable medium of claim 23, wherein the first operation is designed to produce values that have an equal probability of mapping to each of the processes.

26. The computer readable medium of claim 25, wherein the first operation comprises a hash operation on the element.

27. The computer readable medium of claim 23, further comprising:

removing the element from the list after performing the second operation on the element.

28. The computer readable medium of claim 27, for each process, after the process processes all the elements on the list, further performing:

resecuring the list, wherein the resecured list excludes those elements that have been removed from the list by the plurality of processes;
processing each element remaining on the resecured list; and
performing the second operation on the elements on the list.

29. The computer readable medium of claim 28, wherein processing each element remaining on the resecured list further comprises:

determining if another process has reconciled the element being processed, wherein the second operation is performed only if the element being processed has not been reconciled by another process.

30. The computer readable medium of claim 23, wherein each element on the list indicates a time value of a data set in a first storage device and a second storage device, wherein the data set is maintained in both the first and second storage devices, and wherein determining whether one of the first storage device or the second storage device has a more current version of the data set is performed by comparing the time value of the data set in the first storage device indicated by the element and the time value of the data set in the second storage device indicated by the element, and wherein performing the second operation on each element further comprises:

copying the data set from the first or second storage device having the more current version of the data set to the first or second storage device that does not have the more current version.

31. The computer readable medium of claim 30, wherein each element on the list includes a first token and a second token indicating a time value of the data set on the first and second storage devices, respectively, wherein determining whether one of the first or second storage device has the more current version further comprises:

comparing the time value for the data set in the first and second token to determine if the time value is greater in one of the tokens.

32. The computer readable medium of claim 31, wherein a controller controls the first and the second storage devices, further comprising:

generating, at the controller, an updated token including the time value of the most current version of the data set on the first and second storage devices.

33. The computer readable medium of claim 31, further comprising:

retrieving the first and second tokens from first and second servers managing the first and second storage devices, respectively.

34. The computer readable medium of claim 33, wherein a controller controls the first and the second servers that manage the first and the second storage devices respectively, further comprising:

generating, at the controller, an updated token including the time value of the most current version of the data set on the first and second storage devices; and
transmitting the updated token to the first and second servers.

35. A computer readable medium for maintaining a storage system, wherein a plurality of controllers control first and second storage devices and respond to requests from a host, and wherein code included in the computer readable medium causes operations on a machine, the operations comprising:

maintaining data accessible by the controllers in the first and the second storage devices, wherein the data in the first and the second storage devices is accessible to at least one of the controllers, and wherein the data is comprised of a plurality of data sets;
creating a list of elements wherein each element includes information on one data set;
processing, with each controller, each element on the list by:
(i) performing a first operation on the element to produce a value that maps to one of the controllers;
(ii) performing a second operation on the element if the produced value maps to the controller that is processing the element; and
(iii) processing the next element on the list until all the elements are processed, wherein performing the second operation on each element further comprises determining whether one of the first storage device or the second storage device has a more current version of a data set.

36. The computer readable medium of claim 35, wherein each element on the list indicates a time value of a data set in the first storage device and the second storage device.

37. The computer readable medium of claim 35 wherein performing the first operation to produce the result further comprises:

applying a hash function on the element wherein the hash function maps to a hash value that has an equal probability of corresponding to each of the controllers, and wherein the hash value is the result.

38. The computer readable medium of claim 35, wherein each element on the list indicates a time value of a data set in the first storage device and the second storage device, wherein the data set is maintained in both the first and second storage devices, and wherein determining whether one of the first storage device or the second storage device has a more current version of the data set is performed by comparing the time value of the data set in the first storage device indicated by the element and the time value of the data set in the second storage device indicated by the element, and wherein performing the second operation on each element further comprises:

copying the data set from the first or second storage device having the more current version of the data set to the first or second storage device that does not have the more current version.

* * * * *